United States Patent [19]

Bourbon

[11] Patent Number: 4,708,239

[45] Date of Patent: Nov. 24, 1987

[54] LATCHING STORAGE/DISPLAY BOX FOR DISKETTES OR THE LIKE

[75] Inventor: Jean Bourbon, Saint Lupicin, France

[73] Assignee: Ets. A. Bourbon et Fils, Saint Lupicin, France

[21] Appl. No.: 914,086

[22] Filed: Oct. 1, 1986

[30] Foreign Application Priority Data

Oct. 1, 1985 [FR] France ................................ 85 14978

[51] Int. Cl.$^4$ ............................................. B65D 79/00
[52] U.S. Cl. ................................. 206/45.13; 206/45.18; 206/45.2; 206/45.23; 206/387; 220/338; 248/463; 211/42; 40/124.2
[58] Field of Search .................. 206/45.13, 45.23, 45.2, 206/45.18, 45.15, 425, 444, 449, 555, 387; 16/DIG. 13; 220/337, 338; 248/441.1, 447, 456, 455, 463; 312/13; 211/42; 40/124.2, 152.1

[56] References Cited

U.S. PATENT DOCUMENTS

| | | | |
|---|---|---|---|
| 3,003,997 | 10/1961 | Intermill | 206/45.18 |
| 4,289,235 | 9/1981 | Egly | 206/45.15 X |
| 4,368,817 | 1/1983 | Temesvary | 206/45.23 X |
| 4,424,899 | 1/1984 | Rosenberg | 206/45.2 X |
| 4,511,034 | 4/1985 | Pan | 206/555 X |
| 4,573,569 | 3/1986 | Parker | 206/45.18 X |
| 4,598,824 | 7/1986 | Long et al. | 220/338 X |
| 4,634,001 | 1/1987 | Wakelin | 206/45.2 X |

FOREIGN PATENT DOCUMENTS

| | | | |
|---|---|---|---|
| 1071576 | 12/1959 | Fed. Rep. of Germany | 206/45.2 |
| 2132588 | 7/1984 | United Kingdom | 206/444 |

*Primary Examiner*—Stephen Marcus
*Assistant Examiner*—Michael J. Shea
*Attorney, Agent, or Firm*—Karl F. Ross; Herbert Dubno; Andrew Wilford

[57] ABSTRACT

A storage/display box has a base having a generally planar and rectangular base panel having two generally parallel side edges and generally parallel top and bottom edges bridging the side edges, respective side rims extending generally perpendicular from the side edges of the base panel, and a bottom rim extending generally perpendicular from the bottom edge of the base panel and bridging the side rims. The cover has a generally planar and rectangular cover panel having two generally parallel side edges and generally parallel top and bottom edges bridging the side edges, respective side rims extending generally perpendicular from the side edges of the cover panel, a bottom rim extending generally perpendicular from the bottom edge of the cover panel and bridging the side rims, and a top rim extending at about 110° from the top edge of the cover panel parallel to the respective bottom rim and bridging the side rims and having an outer edge. A hinge web is integrally formed with the cover and base between the outer edge of the cover top rim and the top edge of the base panel and the cover and base are movable between a closed position with the panels substantially parallel and the rims of one of the panels nested within the rims of the other panel and a use position with the top rim of the cover lying against the base panel and the panels extending at about 70° to each other. Interengaging latch formations on the cover and base releasably secure the cover and base in the use position.

5 Claims, 6 Drawing Figures

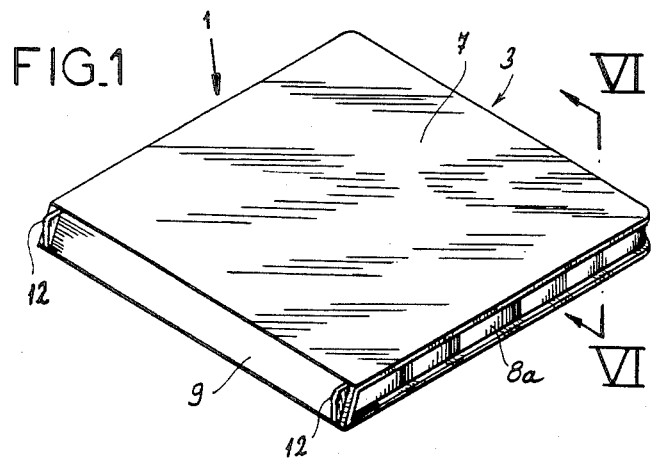
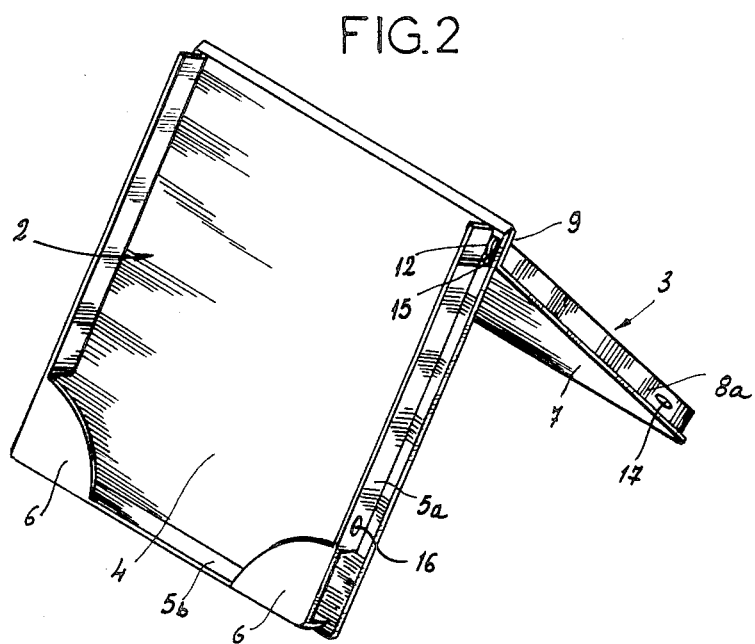

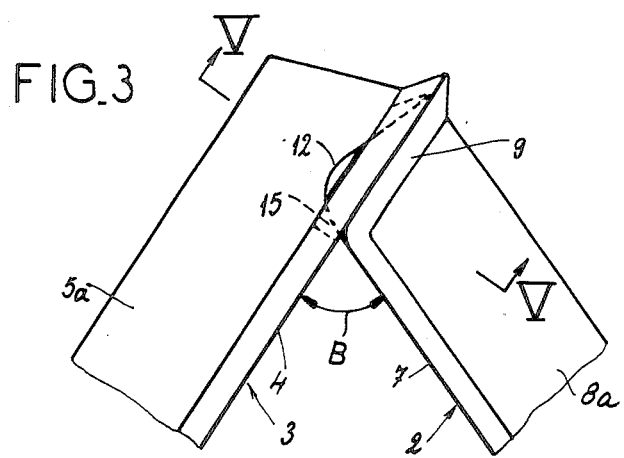
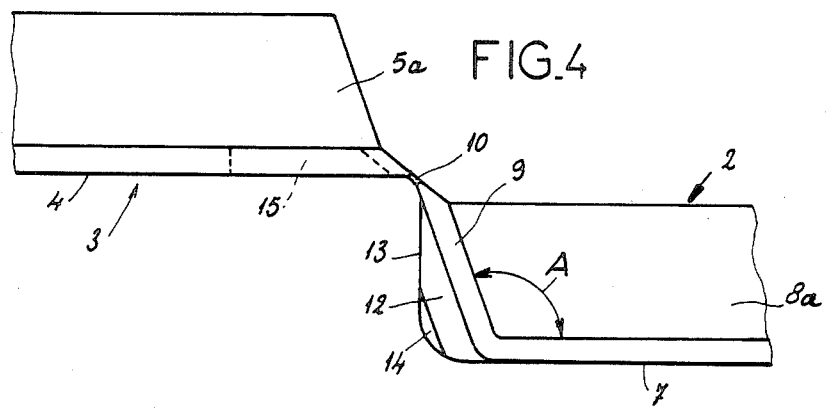
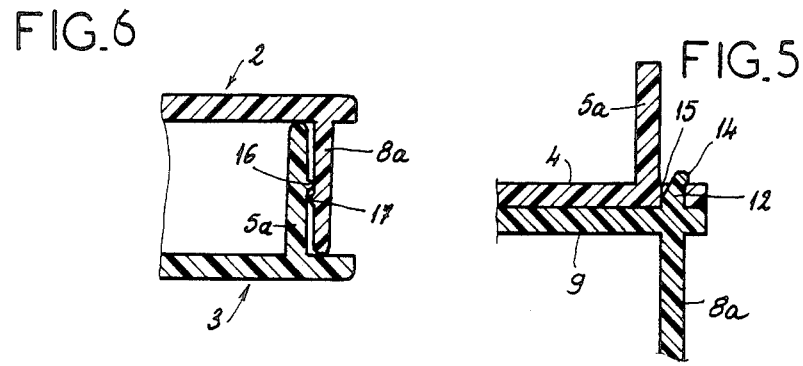
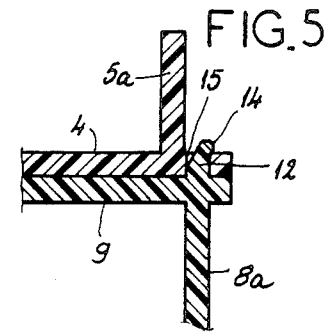

LATCHING STORAGE/DISPLAY BOX FOR DISKETTES OR THE LIKE

FIELD OF THE INVENTION

The present invention relates to a one-piece plastic box. More particularly this invention concerns such a box used for the transportation and display of computer disks or diskettes, microfiches, or the like.

BACKGROUND OF THE INVENTION

A standard storage/display box for diskettes or the like is typically of parallepipedal shape and has a base and a cover that fit together and that are unitarily made of a synthetic-resin with a so-called film hinge. The box can be closed to contain and protect the contents during storage or shipment, and can be opened up to display the contents so they can be withdrawn and used.

The standard such box has a base formed by a rectangular base panel having a bottom edge provided with a perpendicular bottom rim and a pair of parallel side edges provided with respective side rims joined at their bottom ends with the outer ends of the bottom rim. The top panel is similar, but also has a top rim joined at its outer ends with the upper ends of the respective side rims. The base rims fit within the cover rims to define a closed space into which the material being stored fits. An integral web of the synthetic resin of the base and cover is formed between the outer edge of the top rim of the cover and the top edge of the base and forms the film hinge.

Since the rims all stand at 90° to the respective panels, when the box is opened up the base will stand at 45° to the vertical, making, for instance, the labels of diskettes in the box hard to read, and causing the box to take up an inordinate amount of space on the user's desk. In addition the box does not stay in this position as the memory of the synthetic resin causes it to want to fold up and close into the position it usually assumes. Thus it is necessary to secure the box open with a rubber band or some other inconvenient system.

OBJECTS OF THE INVENTION

It is therefore an object of the present invention to provide an improved one-piece storage/display box.

Another object is the provision of such a one-piece storage/display box which overcomes the above-given disadvantages, that is which stands up fairly straight and which holds in the open position, yet which closes hermetically when closed.

SUMMARY OF THE INVENTION

A storage/display box according to the invention has a base having a generally planar and rectangular base panel having two generally parallel side edges and generally parallel top and bottom edges bridging the side edges, respective side rims extending generally perpendicular from the side edges of the base panel, and a bottom rim extending generally perpendicular from the bottom edge of the base panel and bridging the side rims. The cover has a generally planar and rectangular cover panel having two generally parallel side edges and generally parallel top and bottom edges bridging the side edges, respective side rims extending generally perpendicular from the side edges of the cover panel, a bottom rim extending generally perpendicular from the bottom edge of the cover panel and bridging the side rims, and a top rim extending at an angle substantially greater than 90° from the top edge of the cover panel parallel to the respective bottom rim and bridging the side rims and having an outer edge. A hinge web is integrally formed with the cover and base between the outer edge of the cover top rim and the top edge of the base panel and the cover and base are movable between a closed position with the panels substantially parallel and the rims of one of the panels nested within the rims of the other panel and a use position with the top rim of the cover lying against the base panel and the panels extending at an acute angle to each other. Interengaging latch formations on the cover and base releasably secure the cover and base in the use position.

The acute angle formed in the use position ensures that the contents, which are normally held in the base, will stand fairly erect and be easy to see and use. In addition the footprint of the box in the use position will be fairly small. Furthermore, the use of latching formations effective in the use position ensures that the box will not close up when in this position.

According to a feature of this invention the angle in of the top rim to the cover panel is about 110°. This makes the panels extend at an angle of about 70° to each other in the use position, setting the contents at about 35° to the vertical, presuming a symmetric stance of the box in the use position.

The latching formations of this invention include respective tabs projecting from the top rim at the respective side rims and formed with respective lateral bumps and respective holes through the base panel and positioned to snugly receive the respective tabs in a snap fit in the closed position of the box. The tabs are triangular and have an outer edge generally perpendicular to the cover panel so that the outline of the box is rectangular, making stacking of the boxes easy. Such a box is no larger than the standard prior-art box.

In accordance with a further feature of the invention the panels are of substantially the same size but the base side rims are inset further from the respective side edges than the side rims of the cover and the tabs are aligned with the respective lover side rims and the holes being outside the respective side rims. This prevents the holes from providing an entrance for entry into the box of foreign matter.

DESCRIPTION OF THE DRAWING

The above and other features and advantages will become more readily apparent from the following, reference being made to the accompanying drawing in which:

FIGS. 1 and 2 are perspective views of the box according to this invention in the closed and use positions, respectively;

FIG. 3 is a large-scale side view of the hinge of the box in the use position;

FIG. 4 is a view like FIG. 3 but with the box in the fully open position; and

FIGS. 5 and 6 are sections taken along respective lines V—V and VI—VI of FIGS. 3 and 1 and showing the latching means with the box in the use and closed positions, respectively.

SPECIFIC DESCRIPTION

As seen in FIGS. 1 and 2 a box 1 according to this invention has a base 2 and a cover 3 having respective base and cover panels 4 and 7 that are both square and of the same size. Inset somewhat from the side and bottom edges of the base panel 4 on the inner surface thereof are planar side and bottom rims 5a and 5b of the same height, and the corner between each side rim 5a and the base rim 5b being bridged by a triangular gusset 6 parallel to the base panel 4. Somewhat less inset from its side and bottom edges are planar side rims 8a and a bottom rim (not visible in the drawing), with however no structure comparable to the gussets 6. The difference in inset between the rims of the base 2 and cover 3 allows the rims of the base 2 to fit within the rims of the cover 3. These rims are all perpendicular to the planes of the respective panels 4 and 7.

Such a container is used to transport articles like computer disks, in which case the gussets 6 can be replaced by a short front panel. The size of the container depends on the size of the object to be stored, from a 3.5 in microdisk to an 8 in disk, and the shape can even be elongated in one direction, for instance for use with microfiches or magnetic cards. The box 1 of this invention could also be used for transporting and displaying other objects, like a set of drafting pens or colored pencils. The invention is not limited to any particular such object, but merely to a box which can be closed for transport or storage and opened for display and access.

According to this invention the cover 3 is formed with an upper rim 9 bridging the upper ends of the respective side rims 8a and forming an obtuse angle A of 110° with the cover panel 7. The outer edge of this rim 9 is formed with a unitary hinge web 9 connecting it to the upper edge of the base panel 4. In the closed position of FIGS. 1 and 6 the rims of the cover 3 fit within those of the base 2 and the rim 9 closes the space between the upper ends of the side rims 5a of the base 2, forming a relatively tightly closed space protecting the contents of the box 1.

For access to the contents of the box 1, the cover 3 is pivoted back from the base 3, passing through the fully open position of FIG. 4 with the planes of the panels 4 and 7 parallel to the use position of FIGS. 2, 3, and 5. This amounts to 290° of pivoting and leaves the panels 4 and 7 at an angle B of 70° to each other, a position in which the base panel 4 extends at an angle of 35° to the vertical, making the contents of the box 1 easy to see and work with.

Further according to this invention the upper rim 9 of the cover panel 7 as seen in FIGS. 4 and 5 is formed in line with the side rims 8a with lugs 12 having upper edges 13 extending perpendicular to the respective panel 7 and with outwardly directed bumps 14 spaced from but elongated parallel to the rim 9. The base panel 4 is formed immediately outside the top end of each side rim 4a with a complementary throughgoing hole 15. The offset of the bumps 14 from the rim 9 is equal to the thickness of the panel 4 so that the bumps 14 will snap through the holes 15 behind the panel 4 and will, therefore, lock the base 2 and cover 3 releasably in a snap fit in the use position.

In addition as shown in FIG. 6 the outer face of each of the side rims 5a is formed adjacent its lower end, that is near the lower rim 5b, with a bump 16 that can engage inward of a similar bump 17 on the inside of the lower end of the respective rim 8a. These formations therefore retain the base 2 and cover 3 releasably in a snap fit in the closed position.

The box 1 according to this invention can be produced cheaply of a durable synthetic resin to relatively high tolerances. Since the holes 15 are formed outside the rims 5a, they do not create a place foreign matter can enter the box 1. When open the box 1 stands up fairly straight so viewing and using its contents is easy, and the snap fit ensures that the box 1 remains in this position, like an easel. Similarly when closed the box 1 is scarcely larger than its contents, yet hermetically seals them in.

I claim:

1. A storage/display box comprising:
    a base having
        a generally planar and rectangular base panel having two generally parallel side edges and generally parallel top and bottom edges bridging the side edges,
        respective side rims extending generally perpendicular from the side edges of the base panel, and
        a bottom rim extending generally perpendicular from the bottom edge of the base panel and bridging the side rims;
    a cover having
        a generally planar and rectangular cover panel having two generally parallel side edges and generally parallel top and bottom edges bridging the side edges,
        respective side rims extending generally perpendicular from the side edges of the cover panel,
        a bottom rim extending generally perpendicular from the bottom edge of the cover panel and bridging the side rims, and
        a top rim extending at an angle substantially greater than 90° from the top edge of the cover panel parallel to the respective bottom rim and bridging the side rims and having an outer edge;
    a hinge web integrally formed with the cover and base between the outer edge of the cover top rim and the top edge of the base panel, the cover and base being movable between a closed position with the panels substantially parallel and the rims of one of the panels nested within the rims of the other panel and a use position with the top rim of the cover lying against the base panel and the panels extending at an acute angle to each other; and
    means including interengaging latch formations on the cover and base for releasably securing the cover and base in the use position.

2. The storage/display box defined in claim 1 wherein the angle between the top rim and the cover panel is about 110°.

3. The storage/display box defined in claim 1 wherein the formations include
    respective tabs projecting from the top rim at the respective side rims and formed with respective lateral bumps; and
    respective holes through the base panel and positioned to snugly receive the respective tabs in a snap fit in the closed position of the box.

4. The storage/display box defined in claim 3 wherein the tabs are triangular and have an outer edge generally perpendicular to the cover panel.

5. The storage/display box defined in claim 3 wherein the panels are of substantially the same size but the base side rims are inset further from the respective side edges than the side rims of the cover, the tabs being aligned with the respective cover side rims and the holes being outside the respective side rims.

* * * * *